United States Patent
Rajvaidya et al.

(10) Patent No.: US 10,972,335 B2
(45) Date of Patent: Apr. 6, 2021

(54) DESIGNATION OF A STANDBY NODE

(71) Applicant: HEWLETT PACKARD ENTERPRISE DEVELOPMENT LP, Houston, TX (US)

(72) Inventors: Sudhanshu Rajvaidya, San Jose, CA (US); Ruta Vaidya, San Jose, CA (US); Rajeev Verma, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 290 days.

(21) Appl. No.: 15/878,802

(22) Filed: Jan. 24, 2018

(65) Prior Publication Data
US 2019/0229978 A1    Jul. 25, 2019

(51) Int. Cl.
| | |
|---|---|
| *H04L 12/24* | (2006.01) |
| *G06F 11/07* | (2006.01) |
| *G06F 11/20* | (2006.01) |
| *G06F 11/16* | (2006.01) |

(52) U.S. Cl.
CPC ...... *H04L 41/0654* (2013.01); *G06F 11/0709* (2013.01); *G06F 11/0757* (2013.01); *G06F 11/2041* (2013.01); *H04L 41/069* (2013.01); *G06F 11/076* (2013.01); *G06F 11/1662* (2013.01); *G06F 11/2048* (2013.01); *G06F 11/2097* (2013.01); *G06F 2201/81* (2013.01); *G06F 2201/87* (2013.01)

(58) Field of Classification Search
CPC ............... H04L 41/0654; H04L 41/069; G06F 11/0709; G06F 11/0757; G06F 11/2041; G06F 11/076
See application file for complete search history.

(56) References Cited

U.S. PATENT DOCUMENTS

| | | | |
|---|---|---|---|
| 6,609,213 B1 * | 8/2003 | Nguyen ............. | G06F 11/2025 709/223 |
| 7,058,703 B2 * | 6/2006 | Hawkins ............. | G06F 9/4411 709/208 |
| 7,392,421 B1 | 6/2008 | Bloomstein et al. | |
| 7,409,576 B2 * | 8/2008 | Pomaranski ........ | G06F 11/0709 714/3 |
| 8,689,043 B1 | 4/2014 | Bezbaruah et al. | |
| 9,116,862 B1 * | 8/2015 | Rath ................... | G06F 11/2097 |
| 9,317,576 B2 | 4/2016 | Merriman et al. | |

(Continued)

FOREIGN PATENT DOCUMENTS

WO    WO-0233551 A1    4/2002

OTHER PUBLICATIONS

Apache Software Foundation, "HDFS High Availability," Apr. 4, 2017, <https://web.archive.org/web/20170404224959/https://hadoop.apache.org/docs/r2.8.0/hadoop-project-dist/hadoop-hdfs/HDFSHighAvailabilityWithNFS.html>.

(Continued)

*Primary Examiner* — Philip J Chea
*Assistant Examiner* — Robert B McAdams
(74) *Attorney, Agent, or Firm* — Trop, Pruner & Hu, P.C.

(57) ABSTRACT

Examples include designation of a standby node. Some examples may include designation of a new node as a standby node when new transactions logged at a master node during a loss of service between a designated standby node and the master node exceeds a transaction threshold before the duration of the loss of service exceeds a timeout threshold.

20 Claims, 6 Drawing Sheets

(56) References Cited

U.S. PATENT DOCUMENTS

| | | | |
|---|---|---|---|
| 9,697,226 B1 | 7/2017 | Youngworth | |
| 9,836,363 B2* | 12/2017 | Nosov | G06F 11/2007 |
| 10,042,692 B1* | 8/2018 | Azad | G06F 11/079 |
| 2006/0053337 A1 | 3/2006 | Pomaranski et al. | |
| 2007/0276842 A1 | 11/2007 | Miyata | |
| 2009/0157766 A1* | 6/2009 | Shen | G06F 11/2097 |
| 2009/0271412 A1 | 10/2009 | Lacapra et al. | |
| 2010/0100475 A1* | 4/2010 | Callaway | G06F 11/1687 |
| | | | 705/37 |
| 2014/0164831 A1* | 6/2014 | Merriman | G06F 11/1458 |
| | | | 714/20 |

OTHER PUBLICATIONS

Cisco, "Cisco Identity Services Engine Administrator Guide, Release 2.0," (Web Page), 2017, https://www.cisco.com/c/en/us/td/docs/security/ise/2-0/admin_guide/b_ise_admin_guide_20/b_ise_admin_guide_20_chapter_01011.html.

Humayun Yousaf et al., "Always on Cluster Node Restart," Aug. 1, 2017, (web page), <https://social.technet.microsoft.com/Forums/sqlserver/en-US/3350704a-7887-4a95-894d-cf77a6151a95/always-on-cluster-node-start?forum=sqldisasterrecovery>.

Wolski, A. et al., "A Self-Managing High-Availability Database: Industrial Case Study," Apr. 3, 2005, 8 pages, https://www.researchgate.net/profile/Antoni_Wolski/publication/220967256_A_Self-Managing_High-Availability_Database_Industrial_Case_Study/links/0c96051817eaf50c5f000000/A-Self-Managing-High-Availability-Database-Industrial-Case-Study.pdf.

* cited by examiner

DESIGNATION OF A STANDBY NODE

BACKGROUND

Computing clusters comprise connected computing nodes (which may be any form of computing entity such as servers, virtual machines, microprocessors, etc.) which work together, for example via wired or wireless networking. For example, computing clusters can provide distributed or shared memory and/or processing resources.

BRIEF DESCRIPTION OF DRAWINGS

Non-limiting examples will now be described with reference to the accompanying drawings, in which.

DETAILED DESCRIPTION

Figure 1:
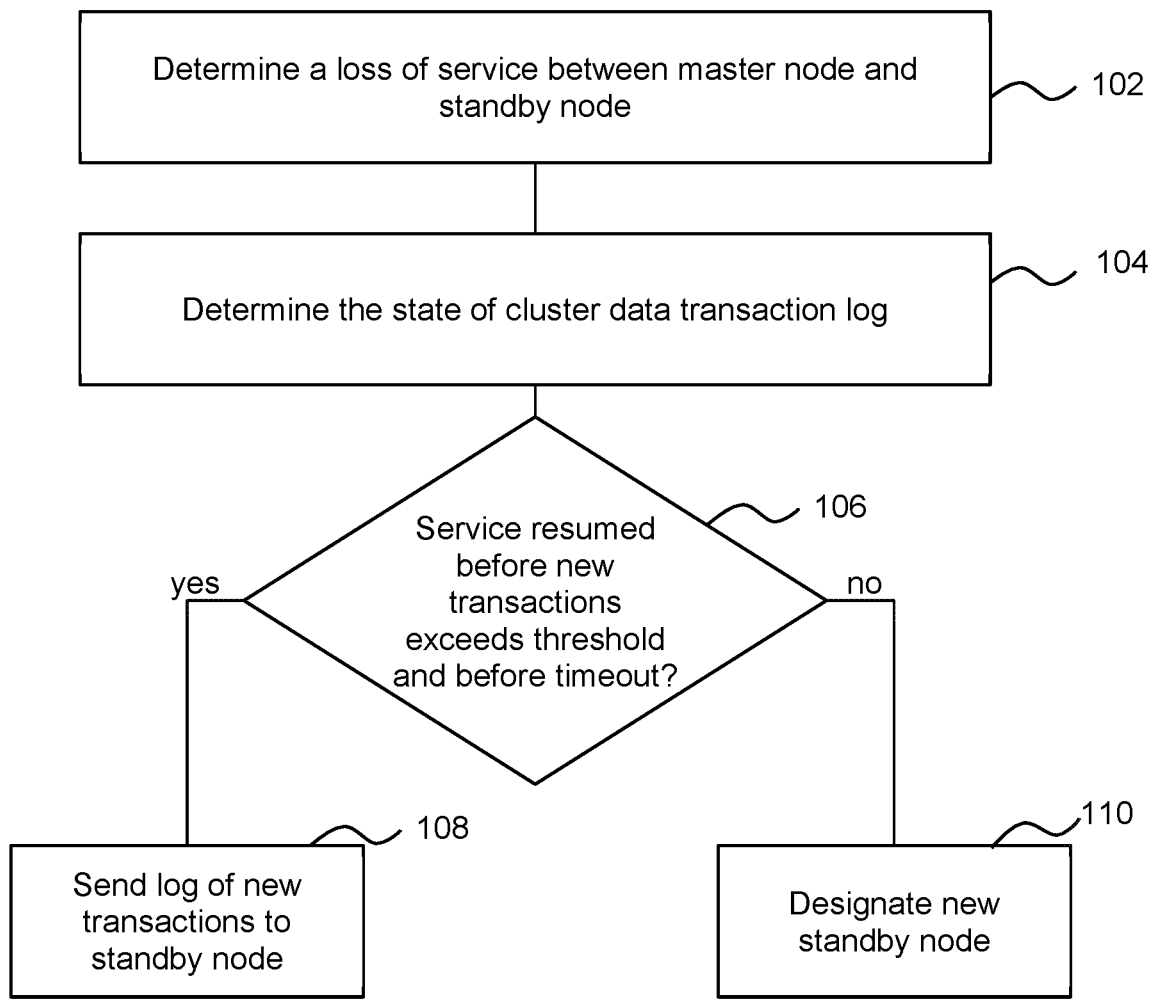
FIG. 1 is a flow chart of an example method of cluster management.

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to. The term "based on" means based at least in part on.

In some examples of multi-node computing clusters, there is a designated 'master', or primary, node which is responsible for management of the cluster, and a designated 'standby', or secondary, node which is synchronised with the master node such that it can act as the master node should the master node suffer a loss of service. In such clusters, the standby node may be described as being in 'hot standby'. The synchronisation may comprise ensuring that the standby node holds an up-to-date copy of cluster data such as a cluster transaction log, which may be a history of actions executed by the cluster (for example, comprising a file listing changes made to records stored within the cluster). Such a transaction log may be used in recovering individual transactions, restoring or rolling back transactions following a failure, or the like.

Therefore, if the master node goes out of service, the standby node is ready to take over as the master node. However, it may also be the case that the standby node goes, at least temporarily, out of service. In such cases, the risk that the cluster becomes unavailable because of failure of the master node increases (i.e., the cluster now has a single point of failure). Moreover, there are challenges in ensuring that the master node and standby node are synchronised and in bringing the standby back into synchronisation if it lags behind as a result of a temporary failure in service, which consumes cluster processing resources.

To reduce such risks, some clusters designate multiple nodes to act as the standby nodes, but this consumes additional cluster processing resources. In other examples, the transaction log may be distributed, for example using shared storage, and for example being stored outside the cluster. This allows a standby node to synchronise from a resource other than the master node (for example, a dedicated 'recovery node'), but can be relatively slow, and may involve storage which is external to the cluster (and which therefore introduces a single point of failure into the cluster).

In examples described herein, a "node" may be a computing device, such as a server, storage array, storage device, desktop or laptop computer, switch, router, or any other processing device or equipment including a processing resource. In examples described herein, a processing resource may include, for example, one processing resource or multiple processing resources included in a single computing device or distributed across multiple computing devices. As used herein, a "processing resource" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. In examples described herein, nodes may communicate with one another via direct connections, via one or more computer networks, or a combination thereof. In examples described herein, a computer network may include, for example, a local area network (LAN), a virtual LAN (VLAN), a wireless local area network (WLAN), a virtual private network (VPN), the Internet, or the like, or a combination thereof.

FIG. 1 is a flow chart of an example of a method, which may be a method of managing a cluster of computing resources or a "computing cluster". In this example, the cluster comprises a plurality of nodes, the plurality of nodes comprising a master node to manage the cluster and to store a node transaction data log and a standby node to store a synchronously replicated copy of the node transaction data log (at least when operating as intended). The functionalities described herein in relation to FIG. 1 may be performed by a node, such as a master node, and may be implemented in the form of processing resource executable instructions stored on a machine readable storage medium, one or more engine(s) (as described herein), electronic circuitry, or any combination thereof.

In some examples, a single node of the cluster acts as the master node at any one time. The master node may be responsible for the management operations of the cluster, including for example designating Application Programming Interface (API) endpoint nodes for the cluster. The master node may also be responsible for setting up another node in the cluster as the standby node, and for replicating cluster data such as the transaction log to it, providing redundancy for the cluster data. In some examples, the master node may carry out operations such as software updates, cluster membership operations such as adding/removing a node, audit logging and user management. In some examples, the master node may provide virtual IP address(es) for the cluster.

In some examples, a single node of the cluster acts as the standby node at any one time. The standby node is the node in a cluster that, at least when operating as intended, has a synchronously replicated copy of the cluster data from the master node. This may in general be any node in the cluster that is chosen by the master node, although in some examples, standby node may be chosen or elected by the master node based on its capabilities and/or historical reliability. This node can serve as the master node in the event of a failure (in some examples, a catastrophic failure) of the master node.

The method comprises, in block 102, determining a loss of service between the master node and the standby node. For example, this may comprise a failure to receive a 'heartbeat' message from the standby node within a predetermine time slot, the failure of the standby node to respond to a request, the receipt of an error message, or the like. In other examples, the failure of a standby node may be detected by monitoring network reachability of the standby node using a continuous 'ping test' (e.g. an Internet Control Message Protocol (ICMP) ping) of IP addresses on the standby node. A failure to respond may result in a detection of a failure of the standby node.

Block 104 comprises determining the state of a cluster data transaction log when the loss of service occurs. For example, the master node may note a current position of the cluster data transaction log. The master node may then continue to operate in the cluster, which continues to receive and process transactions although, unlike in steady-state operation, transactions are logged 'asynchronously', i.e. without synchronisation with any other node.

Block 106 comprises determining whether the service of the standby node is resumed before new transactions logged at the master node during the loss of service exceeds a transaction threshold and before a timeout threshold is reached. In some examples, the transaction threshold may be specified as a threshold cumulative size of a plurality of transactions (e.g., input/output operations). In other examples, the transaction threshold may be specified differently. For example, the transaction threshold may be specified as a threshold number of transactions. The transaction threshold may be predetermined while the cumulative size or number of the new transactions logged at the master node during a loss of service may be dynamically calculated. If neither the transactions threshold nor the duration threshold is exceeded when service is resumed, block 108 comprises sending, by the master node, a log of the new transactions to the standby node. It may be noted that the log of new transactions are sent directly from the master node, rather than from some other resource such as an external memory resource or a dedicated recovery node.

However, when at least one of the transaction threshold is exceeded by the new transactions or the timeout threshold is reached before the service of the standby node is resumed, the method proceeds to block 110 and comprises designating, by the master node, a new standby node. In such cases, a full dataset log may be copied to the new standby node. This is a faster process than syncing a transaction log.

The method allows a balance between the risk of the cluster becoming unavailable due to the double failure of the standby node then the master node, the cluster resources consumed in resynchronisation the standby node and the relatively resource heavy designation of a new standby node. For example, it may be only when either the new entries to transaction log become sufficiently numerous (or cumulatively large) that a resynchronisation exercise would place an undue burden on the cluster resources, and/or a period of unavailability of the standby node becomes so long that the risk of the cluster becoming unavailable due to the double failure of the standby node and the master node exceeds a threshold that the resource heavy exercise of designating a new standby node is carried out. In some examples (one of which is discussed in greater detail below) the thresholds may depend on service level agreements, processing speeds within the cluster, and/or the size of the transactions to be added to the log (e.g. in bytes, kilobytes, megabytes, or the like).

In some examples, the loss of service in the standby node described in block 104 and/or the state of the cluster data transaction log as described in block 106 are determined by the master node.

Figure 2:
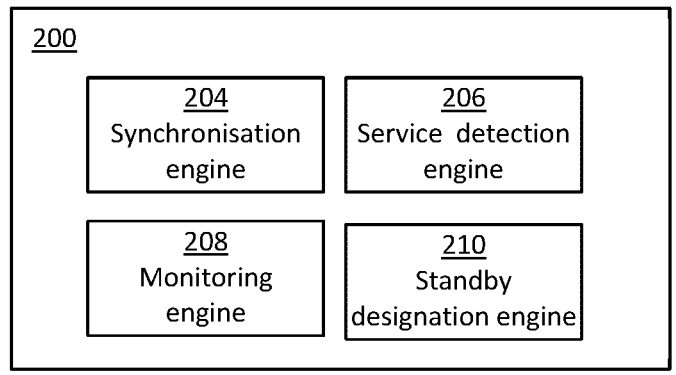
FIG. 2 is a block diagram of an example of a node of a multi-node cluster.

FIG. 2 is a block diagram of an example of a node 200 which may operate in a multi-node cluster. The node 200 comprises a synchronisation engine 204, a service detection engine 206, a monitoring engine 208 and a standby designation engine 210.

The node 200 may operate as a master node of a cluster. When in operation as the master node of a cluster, the synchronisation engine 204 may, at least when the standby node is available, synchronise a transaction log with a designated standby node (which may be a single designated standby node). The service detection engine 206 may monitor the presence of service (e.g., ability to communicate via at least one computer network) or a loss of service (e.g., loss of ability to communicate via at least one computer network) between the master node and the standby node. The monitoring engine 208 may monitor the duration of a loss of service in the standby node and may monitor a number of new transactions at the master node during the loss of service. Monitoring engine 208 may determine whether the duration of the loss of service between the master node and the standby node exceeds a predetermined timeout threshold. Monitoring engine 208 may also determine whether the new transactions at the master node during the loss of service exceeds a transaction threshold (i.e., before the duration of the loss of services exceeds the timeout threshold). In some examples, monitoring engine 208 may determine whether the cumulative size of the new transactions at the master node during the loss of service exceeds a transaction threshold (as described below). In other examples, monitoring engine 208 may determine whether the number of the new transactions at the master node during the loss of service exceeds a transaction threshold (specified as a threshold number of transactions). The standby node designation engine 210 may designate a node of the cluster as a standby node.

The engines 204, 206, 208, 210 may be any combination of hardware and programming to implement the functionalities of the engine(s). In examples described herein, such combinations of hardware and programming may be implemented in a number of different ways. For example, the programming for the engines 204, 206, 208, 210 may be processing resource executable instructions stored on at least one non-transitory machine-readable storage medium and the hardware for the engines may include at least one processing resource to execute those instructions. In some examples, the hardware may also include other electronic circuitry to at least partially implement at least one of the engine(s) 204, 206, 208, 210. In some examples, the at least one machine-readable storage medium may store instructions that, when executed by the at least one processing resource, at least partially implement some or all of the engine(s) 204, 206, 208, 210. In such examples, a computing device at least partially implementing the processing circuitry 202 may include the at least one machine-readable storage medium storing the instructions and the at least one processing resource to execute the instructions. In other examples, the engine(s) 204, 206, 208, 210 may be implemented by electronic circuitry.

In operation of the node 200 as a master node, when the service detection engine 206 determines that service of the standby node is resumed before the timeout threshold is exceeded and before the transaction threshold is exceeded, the synchronisation engine 204 may send, to the designated standby node, a record (i.e. the log entries) of any new transactions logged at the master node since the loss of service occurred. When the monitoring engine 208 detects that the cumulative size of new transactions at the master node during the loss of service exceeds the transaction threshold (before the duration exceeds the timeout threshold), the standby node designation engine 210 may designate a new node of the cluster as a standby node. When the monitoring engine 208 detects that the duration exceeds the timeout threshold, the standby node designation engine 210 may designate a new node of the cluster as a standby node.

In some examples, the node 200 may determine an indication of the reliability of another node. For example, the standby designation engine 210 may monitor a frequency of loss of service events of nodes of the cluster (for example based on data gathered by the monitoring engine 210) and determine whether the frequency of loss of service events exceeds a threshold (or viewed another way, may determine the number of failure events within a predetermined time period), and, in the event that the frequency of loss of service events of a particular node exceeds the threshold, the standby node designation engine 210 may designate a different node of the cluster as a standby node. In other examples, the length of time for which a node is out of service may be considered in addition or alternatively to the frequency of loss of service events. In other examples, synchronisation failures of all types may be considered by the monitoring engine 208 to determine the reliability of prospective standby node, to result in the selection of historically more reliable nodes as the standby node.

In some examples, the reliability of each node may be compared to the reliability of the other nodes of the cluster. In the event that one of the other nodes is deemed reliable, and the monitoring engine 208 detects that either a cumulative size of new transactions has exceeded the transaction threshold before the duration of the loss of service has exceeded the timeout threshold, or the timeout threshold is exceeded, such a more reliable node may be selected by the standby node designation engine 210.

This allows a node which is consistently unreliable to be identified by its behaviour over time. If a particular node in a cluster is unreliable and goes out of service too frequently or services on the standby node consistently take a relatively long period to resume, such a monitoring engine 208 allows a different standby node to be selected to replace the previous standby node.

In some examples, the synchronisation engine 204 may synchronise the transaction log with a single designated standby node until a new designated standby node is designated, and the newly designated standby node may replace the previously designated standby node (as the standby node) in the cluster. In other words, in some examples, there is only one single standby node designated by the master node 200 at any time.

In some examples, there may be a plurality of nodes within a cluster (possibly all of the nodes of the cluster) which comprise engines 204, 206, 208, and 210 as described above. In some examples, the engines may be disabled (or otherwise not operate) unless this node is acting as the master node. In other words, it may be the case that a plurality of nodes of the cluster are capable of acting as the master node but that only one node does so at any particular time.

Figure 3:
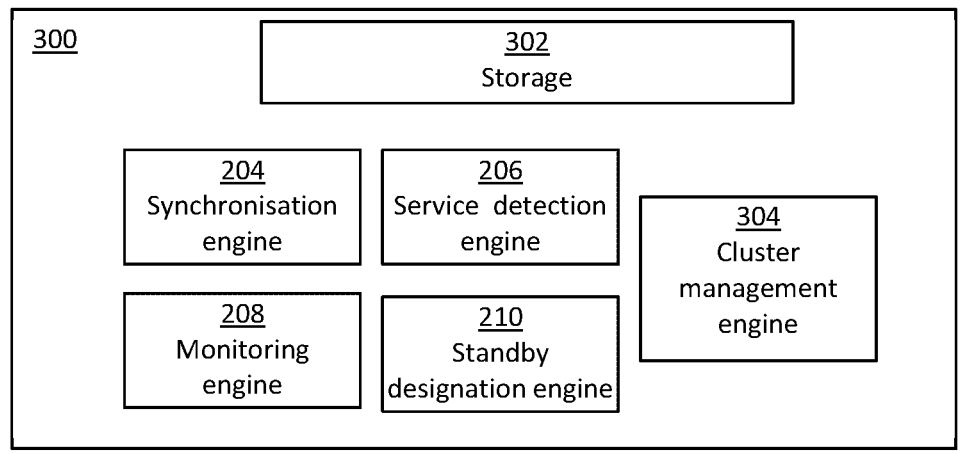
FIG. 3 is a block diagram of another example of a node of a multi-node cluster.

FIG. 3 is a block diagram of another example of a node 300 in which the features in common with the node 200 of FIG. 2 are labelled with like numbers and have the features discussed above. In this example, the node 300 additionally comprises storage 302 to store the transaction log. The storage 302 may store other cluster data such as currently designated cluster endpoints, gateways, or the like. In some examples, the master node may store any or any combination of information about cluster users and their permissions, information about cluster clients (for example, Internet Small Computer Systems Interface (iSCSI) and/or fiber channel (FC) endpoints), data relating to how user data is distributed over the various nodes of the cluster, statistics about the pattern of data access and/or the performance of the cluster, encryption keys, audit events and the like.

In addition, the node 300 comprises a cluster management engine 304 which, when the node 300 is acting as a master node, manages the cluster. For example, the cluster management engine 304 may designate one or more endpoints (for example API endpoints) for a cluster, manage membership of the cluster, synchronize configuration updates to members of the cluster and maintain consistency of that configuration, and the like. The cluster management engine 304 may be implemented in the same manner as any of the implementations of engines described above.

As described in relation to FIG. 1, during a loss of service between the master node and a standby node and before the duration of the loss of service reaches a timeout threshold, the master node may continue to operate substantially normally, except that it does not back up the log of new transactions to a standby node (i.e. it operates asynchronously), while it accumulates log transactions which would otherwise be written to the out-of-reach standby node. Once the cumulative size (or number) of transactions accumulates to exceed the transaction threshold, the master node may abort the strategy of waiting for the standby node to resume services. This accumulated 'lag' in transactions replicated to a standby node may be thought of as a 'lag threshold'.

Figure 4:
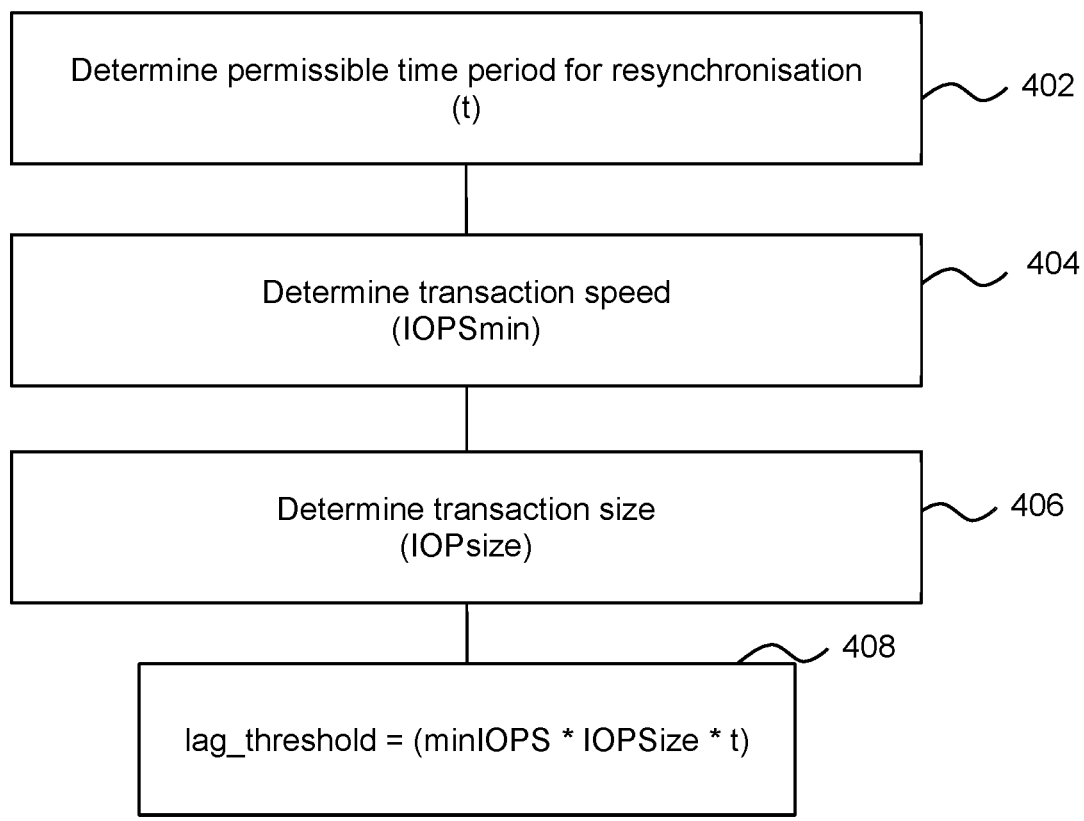
FIG. 4 is a flow chart of an example of a method for determining thresholds.

FIG. 4 is a flow chart of an example of a method of determining the cumulative size of new transactions which may be recorded (e.g. logged by the master node) during a loss of service of a standby node before the designation of the new standby node. In a particular example, this may depend upon a service level agreement. In some examples, the service level agreement may be an agreement to provide a high availability cluster. The functionalities described herein in relation to FIG. 4 may be performed by a node (e.g., a master node), and may be implemented in the form of processing resource executable instructions stored on a machine readable storage medium, one or more engine(s) (as described herein), electronic circuitry, or any combination thereof.

In block 402, the amount of time it takes the standby node to re-synchronise with the master node (i.e., the amount of time to complete a re-synchronization process) is determined (time t). In practice, it may be the case that the majority of this time may be the time taken for resynchronisation. This time period may for example be specified in the service level agreement for the cluster, may in some example be a standard time for any node of a cluster (i.e., this time period may be non-node specific), and may be configurable. In some examples, the time may include an acceptable duration of a loss of service as well as a node recovery time.

In block 404, the transaction speed of the standby node is determined. For example this may comprise determining the minimum number of operations per second of the standby node (which may be characterised as input output operations per second or IOPS). The minimum number of operations may be a 'worst case scenario' value, i.e., a minimum speed under load. This is referred to herein as minIOPS and may depend on variables such as the type of cluster, for example which type of processors are included in the cluster, whether the cluster is all-flash memory cluster, is a hybrid cluster (e.g. includes some disk-based services, which tend to be slower than flash based services), the speed of the various cluster nodes, and the like. This may be derived based on data held by the master node, which may store data relating to the speed of every node in the cluster based on each node's model number and configuration, and therefore may comprise a data record of the speed of the standby node.

In addition, in block 406, a transaction size is determined, this example comprising the size of each input/output operation (i.e., IOPsize). These may be the standard size, or the average size, for example. In some clusters, the size may be configurable, but once established, each transaction may be of a standard size. In such examples, the size may be determined from configuration data, which may for example be stored on the master node. In some examples, this size may be specific to the standby node. In some examples, this may be determined in the unit of megabytes.

In block 408, the threshold cumulative size of new transactions which may be accumulated at the master node during a loss of service before designating a new standby node may be determined. This cumulative size may be a transaction threshold, as described herein, and is represented by "lag_threshold" below. In some examples, this transaction threshold (e.g., "lag_threshold") may be calculated as:

lag_threshold=minIOPS*IOPSize*$t$

For example, minIOPS may be around 1 to 10 IOPS, IOPSize may be on the order of a few kilobytes (e.g. between 5 KB and 15 KB) and t may be around 10 seconds to 2 mins. In a particular example in which minIOPS is 2, IOPSize is 8 KB and t=60 seconds, the cumulative size of new transactions permitted before a new standby node is designated (Lag_threshold) is 960 KB.

If the standby node comes back into service within the timeout duration and before the lag_threshold has been exceeded, then the master node may continue to operate using the currently designated standby node. This lag_threshold value, as described above, may be used as the transaction threshold as described herein.

In general, a master node may be faster than the standby node (this is because the fastest node may be selected to be the master node), and may be undertaking significant activity while the standby node is unreachable: where log data increases at a rapid rate, this may mean that a new standby node may be designated sooner than in examples in which the log data is building up at a slower rate.

The timeout threshold (i.e., duration) may be specific to a standby node, for example being associated with the the model and/or configuration of that node (which may be data which is stored in the master node). Some nodes may generally (for example, in the event of a usual temporary outage) reconnect faster than others, and thus be associated with a shorter timeout threshold. The timeout duration is the time for which the master node will wait when it loses contact with the standby node in hopes that the standby node will come back quickly (or within an expected 'temporary' outage of the node, as compared to a more serious outage). However during this wait time period, if a master node determines that the standby node will take too long to recover (i.e. the transaction threshold is exceeded), then it may "tear down" the current standby node and select a new standby node.

In other words, if either the timeout duration or the transaction threshold is exceeded, the master node may 'tear down' the designated standby node and may select, for example by election, a new standby node. In some examples, the standby node may be selected based on its capabilities and/or its historical reliability (i.e. how many service failures it has suffered in the past).

Figure 5:
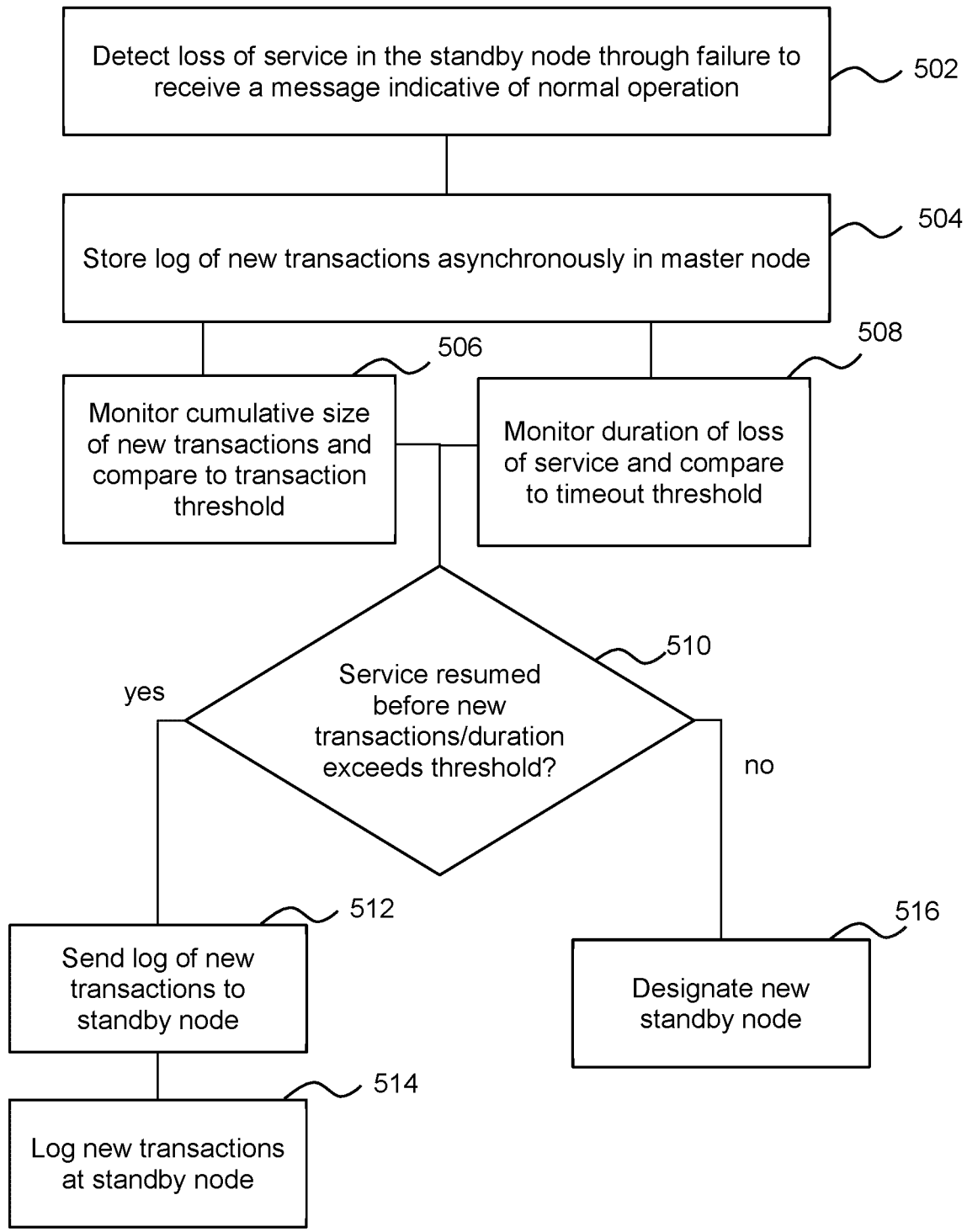
FIG. 5 is a flow chart of an example of a method of cluster management.

FIG. 5 is a block diagram of another example of a method which may be carried out by a master node during and following a loss of service in the designated standby node of the cluster. The functionalities described herein in relation to FIG. 5 may be performed by a node (e.g., a master node), and may be implemented in the form of processing resource executable instructions stored on a machine readable storage medium, one or more engine(s) (as described herein), electronic circuitry, or any combination thereof.

Block 502 comprises detecting, by the master node, a loss of service between the standby node and the master node in the event that a message indicative of normal operation of the standby node is not received in a predetermined time interval. In other words, the failure to receive a heartbeat signal (or the like) indicating the health of the standby node may trigger the master node to determine that there is a loss of service between the standby node and the master node.

Block 504 comprises logging, asynchronously, by the master node, new transactions. In general, log entries of new transactions may be added to an existing log. In other words, new entries to the transaction log are made and these are not backed up to any other device or node (such as a standby node). Block 506 comprises monitoring, by the master node, the cumulative size of new transactions at the master node during the loss of service and comparing the cumulative size of new transactions to a transaction threshold, which may be a threshold as determined by the method of FIG. 4. In other embodiments, Block 506 may comprise monitoring, by the master node, the number of new transactions at the master node during the loss of service and comparing the number of new transactions to a transaction threshold (when the transaction threshold specifies a threshold number of transactions). Block 508, which is carried out concurrently with block 506, comprises monitoring, by the master node, a duration of the loss of service, and comparing the duration of the loss of service to a timeout threshold.

Block 510 comprises determining whether the standby node has resumed services before either the transaction threshold of block 506 or the timeout threshold of block 508 is exceeded. If the standby node has resumed services before either threshold is exceeded, in block 512 the method further comprises sending, from the master node, any new transactions at the master node (during the loss of service) to the standby node and, in block 514, logging, by the standby node, the new transactions sent from the master node. However, if either threshold is exceeded, the method proceeds with block 516 and comprises designating, by the master node, a new standby node, as described above in relation to block 110 of FIG. 1.

Figure 6:
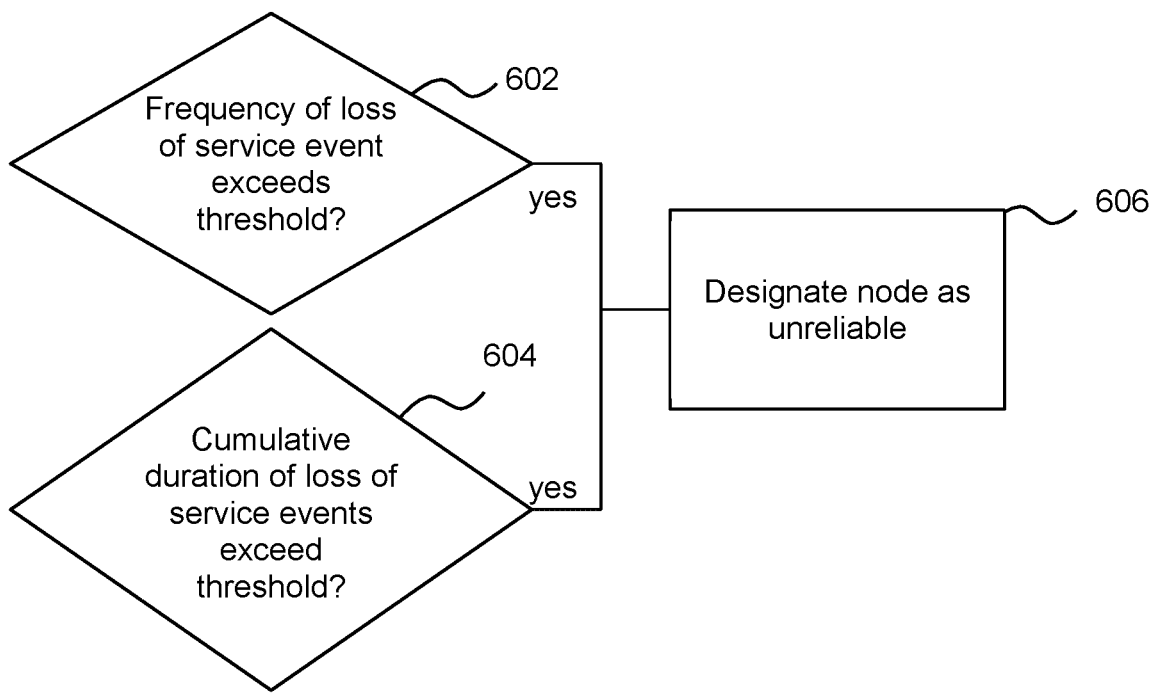
FIG. 6 is a flow chart of another example of a method of cluster management.

FIG. 6 shows an example of a method, which may be a method of identifying an unreliable node. Block 602 comprises determining whether the frequency of a loss of service events of a node exceeds a frequency threshold and block 604 comprises determining whether the cumulative duration of a plurality of loss of service events of a given standby node over time exceeds a cumulative time threshold. In the event that either or both of these thresholds is exceeded for a given node, the node may be designated as unreliable in block 606. In some examples, such a node will be less likely to be selected as a new standby node as described herein (e.g., at block 110 of FIG. 1 or block 510 of FIG. 5). In other examples, the determination that the node is unreliable may depend on only one of the determination of block 602 and 604. The functionalities described herein in relation to FIG. 6 may be performed by a node (e.g., a master node), and may be implemented in the form of processing resource executable instructions stored on a machine readable storage medium, one or more engine(s) (as described herein), electronic circuitry, or any combination thereof.

Figure 7:
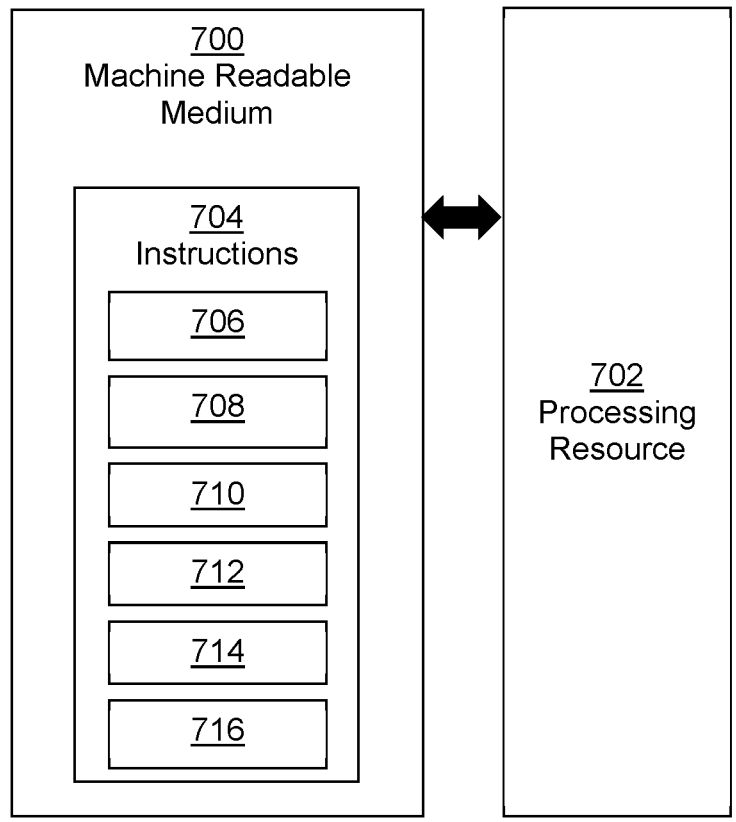
FIG. 7 is a block diagram of an example machine readable medium associated with a processing resource.

FIG. 7 shows an example of a non-transitory machine readable storage medium 700 in association with a processing resource 702. The machine readable storage medium 700 comprises instructions 704 which, when executed by the processing resource 702, cause the processing resource 702 to carry out various operations. In this example, the instructions 704 comprise instructions 706 to cause the processing resource to monitor whether at least one node of the cluster is providing an intended service, instructions 708 to cause the processing resource 702 to designate a standby node of the cluster to hold a synchronised copy of a transaction log of a master node of the cluster, instructions 710 to cause the processing resource 702 to synchronise the transaction log of the master node and the designated standby node, instructions 712 to cause the processing resource 702 to monitor a duration of a loss of service between the master node and the designated standby node, instructions 714 to cause the processing resource 702 to monitor new transactions logged in a transaction log of the master node during the loss of service (e.g., monitor records of the new transactions added to the transaction log of the master node), and instructions 716 to cause the processing resource 702 to designate a new node as a standby node when the new transactions logged in the transaction log during the loss of service between the designated standby node and the master node exceeds a transaction threshold (e.g., cumulative size threshold, number of transactions threshold) before the duration of the loss of service exceeds a timeout threshold.

In some examples, the machine readable medium 700 further comprises instructions which, when executed by the processing resource 702, cause the processing resource 702 to, following a loss of service of a designated standby node during which the new transactions logged in the transaction log during the loss of service is below the transaction threshold and the duration of the loss of service is below the timeout threshold, synchronise the transaction log of the master node and the designated standby node by sending the log entries for any new transactions received during the loss of service to the designated standby node.

In some examples, the machine readable medium 700 further comprises instructions which, when executed by the processing resource 702, cause the processing resource 702 to monitor a frequency of loss of service events a node and to determine if the frequency of loss of service events exceeds a threshold, and, in the event that the frequency of loss of service events exceeds the threshold, designate a different node of the cluster as a standby node.

In some examples, the instructions may comprise instructions to cause the processing resource 702 to perform the functionalities described above in relation to one or more blocks of FIG. 1, 4 or 5. In some examples, the instructions may comprise the programming of any of the engines 204, 206, 208, 210, 304 described in relation to FIGS. 2 and 3. In such examples, processing resource 702 may comprise the hardware of any of the engines 204, 206, 208, 210, 304 described in relation to FIGS. 2 and 3. As used herein, a "machine readable storage medium" may be any electronic, magnetic, optical, or other physical storage apparatus to contain or store information such as executable instructions, data, and the like.

For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Figure 8:
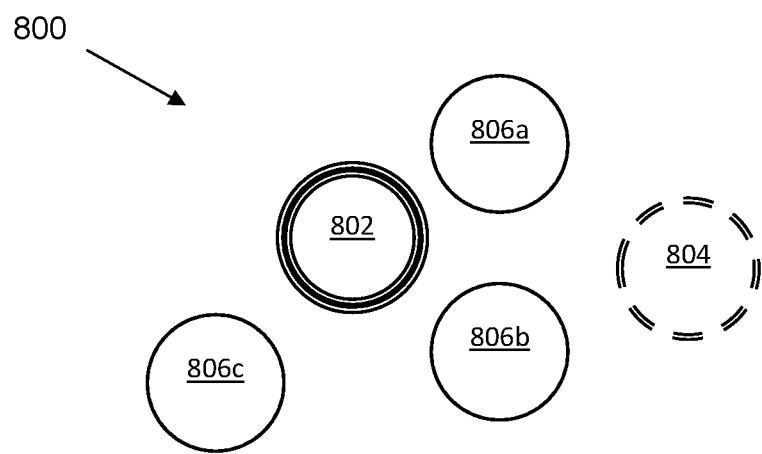
FIG. 8 is a diagram of an example of a multi-node cluster.

FIG. 8 is a diagram of an example of a cluster 800 according to an example. The cluster 800 comprises a single master node 802 and a single designated standby node 804. At least one of the remaining nodes 806a-c may, in some examples, have the capacity to act as a master node or as a standby node however, the role of the master node is performed by one individually designated node and the role of the standby node is performed by another individually designated node in examples of a processing cluster as described herein. The master node 802 in this example carries out the method of FIG. 1.

The nodes 802, 804, 806 may comprise any processing resources and in some examples may comprise different types of processing resources. For example, the nodes 802, 804, 806 may comprise any of or any combinations of a CPU, a disk, a memory card, a network card, a microprocessor, or the like. In some examples, the node may comprise a server, a processing core, a virtual machine, or the like.

In some examples, the cluster 800 may comprise a data storage cluster. For example, the nodes 802, 804, 806 may each provide memory resources and transactions, for example database entries or other data, may be stored on different ones of the nodes 802, 804, 806. In some examples, the master node 802 may designate to which node 802, 804, 806 a transaction may be sent for storage.

In some examples, the cluster 800 may be configured to provide highly available API end point(s) and/or to permit member node management.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and/or blocks in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus (such as the synchronisation engine 204, the service detection engine 206, the monitoring engine 208, the standby designation engine 210 and the cluster management engine 304) may be implemented by a processing resource executing machine readable instructions stored in a memory, or a processing resource operating in accordance with instructions embedded in logic circuitry. The methods and functional modules may all be performed by a single processor or divided amongst several processors.

Such machine readable instructions may also be stored in a computer readable storage medium that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other processing resource may fulfil the functions of several units recited in the claims.

The features of any dependent claim may be combined with the features of any of the independent claims or other dependent claims, in any combination.

The invention claimed is:

1. A method comprising:
determining a loss of service between a master node and a first standby node in a cluster comprising a plurality of nodes, wherein the master node is to manage the cluster and to store a node transaction data log, and the first standby node is to store a synchronously replicated copy of the node transaction data log;
determining a state of a cluster data transaction log when the loss of service occurs;
determining whether an amount of new transactions logged at the master node during the loss of service exceeds a transaction threshold;
comparing a duration of the loss of service to a timeout threshold before a service of the first standby node is resumed; and
in response to the amount of the new transactions logged at the master node during the loss of service exceeding the transaction threshold or the duration of the loss of service exceeding the timeout threshold before the service of the first standby node is resumed, designating, by the master node, a second standby node as a new standby node.

2. The method of claim 1, comprising:
prior to the loss of service, synchronously replicating data of transactions at the master node with the replicated copy of the node transaction data log at the first standby node; and
during the loss of service, logging the new transactions on the master node asynchronously during the loss of service such that the new transactions are not synchronized with any other node in the cluster.

3. The method of claim 1, comprising:
determining the transaction threshold based on at least one of a transaction speed of the first standby node, a transaction size of an input/output operation, or a predetermined time for resynchronization of the first standby node.

4. The method of claim 1, further comprising logging, by the first standby node, any of the new transactions sent from the master node to the first standby node.

5. The method of claim 1, further comprising monitoring at least one of a frequency or a duration of loss of service events of a node in the cluster, and in response to at least one of the frequency or the duration of the loss of service events of the node exceeding a threshold, designating, by the master node, the node as unreliable.

6. A first node of a node cluster, comprising:
a processing resource; and
a non-transitory machine-readable storage medium comprising instructions executable by the processing resource to:
synchronize a transaction log with a first standby node;
detect a loss of service between the first node and the first standby node;
determine a duration of the loss of service between the first node and the first standby node, and an amount of new transactions during the loss of service;
determine whether at least one of the amount of the new transactions exceeds a transaction threshold or the duration exceeds a timeout threshold;
in response to a determination that a service of the first standby node has resumed before the amount of the new transactions exceeds the transaction threshold and before the duration exceeds the timeout threshold, send a record of any new transactions logged at the first node since the loss of service occurred to the first standby node; and
in response to a determination that at least one of the amount of the new transactions has exceeded the transaction threshold or the duration has exceeded the timeout threshold, designate another node of the node cluster as a second standby node.

7. The first node of claim 6, wherein the instructions are executable by the processing resource to synchronize the transaction log with a single designated standby node at any time.

8. The first node of claim 6, wherein the instructions are executable by the processing resource to:
   monitor a frequency of loss of service events of a given node of the node cluster;
   determine whether the frequency of the loss of service events of the given node exceeds a frequency threshold; and
   in response to the frequency of the loss of service events exceeding the frequency threshold, designate a node other than the given node in the node cluster as a standby node.

9. The first node of claim 7, wherein the instructions are executable by the processing resource to manage the node cluster.

10. The first node of claim 9, wherein the instructions are executable by the processing resource to designate an endpoint for the node cluster.

11. A non-transitory machine-readable storage medium comprising instructions that upon execution cause a system to:
   designate a first standby node of a cluster of nodes to hold a synchronized copy of a transaction log of a master node of the cluster;
   synchronize the transaction log of the master node with the copy of the transaction log at the first standby node;
   monitor a duration of a loss of service between the master node and the first standby node;
   monitor an amount of records added to the transaction log of the master node during the loss of service; and
   designate a new node of the cluster of nodes as a second standby node in response to the amount of the records added to the transaction log of the master node during the loss of service exceeding a transaction threshold or the duration of the loss of service exceeding a timeout threshold.

12. The non-transitory machine-readable storage medium of claim 11, wherein the instructions upon execution cause the system to:
   in response to the amount of the records added to the transaction log of the master node not exceeding the transaction threshold and the duration of the loss of service not exceeding the timeout threshold, synchronize the transaction log of the master node and the copy of the transaction log at the first standby node by sending a log of any new transactions received at the master node during the loss of service to the first standby node.

13. The non-transitory machine-readable storage medium of claim 11, wherein the instructions upon execution cause the system to:
   monitor a frequency of loss of service events of a given node of the cluster of nodes;
   determine whether the frequency of the loss of service events of the given node exceeds a frequency threshold; and
   in response to the frequency of the loss of service events exceeding the frequency threshold, designate a node other than the given node in the cluster of nodes as a standby node.

14. The non-transitory machine-readable storage medium of claim 11, wherein no more than one node of the cluster of nodes acts as a standby node at any one time.

15. The non-transitory machine-readable storage medium of claim 11, wherein the instructions to designate a new node as a standby node are executable by at least one processing resource of the master node.

16. The method of claim 1, wherein no more than one node, of the plurality of nodes of the cluster, acts as a standby node at any one time.

17. The method of claim 1, comprising:
   responsive to a service of the first standby node resuming before the amount of the new transactions logged at the master node during the loss of service exceeds the transaction threshold and before the duration of the loss of service exceeds the timeout threshold, sending, by the master node, a log of the new transactions to the first standby node.

18. The first node of claim 6, wherein no more than one node of the node cluster acts as a standby node at any one time, and the first node is a master node of the node cluster.

19. The method of claim 1, wherein the amount of the new transactions is a quantity of the new transactions logged at the master node during the loss of service.

20. The method of claim 1, wherein the amount of the new transactions is a cumulative size of the new transactions logged at the master node during the loss of service.

\* \* \* \* \*